(12) United States Patent
Danielsson et al.

(10) Patent No.: US 9,691,359 B2
(45) Date of Patent: Jun. 27, 2017

(54) VEHICLE DISPLAY SYSTEM WITH TRANSPARENT DISPLAY LAYER

(71) Applicant: SAAB AB, Linkoeping (SE)

(72) Inventors: Torkel Danielsson, Linkoeping (SE);
Anders Gripsborn, Ljungsbro (SE);
Jan Hakegard, Linkoeping (SE);
Joergen Larsson, Linkoeping (SE)

(73) Assignee: SAAB AB, Linkoeping (SE)

( * ) Notice: Subject to any disclaimer, the term of this patent is extended or adjusted under 35 U.S.C. 154(b) by 66 days.

(21) Appl. No.: 14/435,360

(22) PCT Filed: Oct. 15, 2012

(86) PCT No.: PCT/SE2012/051104
§ 371 (c)(1),
(2) Date: Apr. 13, 2015

(87) PCT Pub. No.: WO2014/062102
PCT Pub. Date: Apr. 24, 2014

(65) Prior Publication Data
US 2015/0302827 A1    Oct. 22, 2015

(51) Int. Cl.
*G09G 5/14*    (2006.01)
*G01C 23/00*   (2006.01)
(Continued)

(52) U.S. Cl.
CPC .............. *G09G 5/14* (2013.01); *G01C 23/00* (2013.01); *G06F 3/0481* (2013.01);
(Continued)

(58) Field of Classification Search
CPC combination set(s) only.
See application file for complete search history.

(56) References Cited

U.S. PATENT DOCUMENTS

| 4,954,818 A | 9/1990 | Nakane et al. |
| 5,729,704 A * | 3/1998 | Stone ...................... G06T 11/00 345/619 |

(Continued)

FOREIGN PATENT DOCUMENTS

| EP | 0439873 A1 | 8/1991 |
| EP | 1675395 A1 | 6/2006 |

(Continued)

OTHER PUBLICATIONS

Airlines Electronic Engineering Committee, "Cockpit Display System Interfaces to User Systems ARINC Specification 661-2", Jun. 30, 2005, 308 pages, retrieved from URL:http://read.pudn.com/downloads111/ebook/462188/ARINC661-2005.pdf on May 20, 2016, Aeronautical Radio, Inc., U.S.A.

(Continued)

*Primary Examiner* — Wesner Sajous
(74) *Attorney, Agent, or Firm* — Alston & Bird LLP

(57) ABSTRACT

The invention pertains to display method, a computer program for performing the steps of the display method and a display system (1), the display system having for example: at least one display unit (13, 16) arranged to present at least one display image, at least one memory unit (12, 15) comprising information related to for example descriptions of a set of default graphics display objects (W1-W3) and configuration data. The configuration data is arranged to define: at least one transparent display layer (L1-L3), at least one transparent display container (CO0-CO2) associated to the at least one transparent display layer and at least one display mode. Each of said at least one display mode comprising a predetermined selection of one or more of said at least one transparent display container of one or more of said at least one display layer.

17 Claims, 5 Drawing Sheets

(51) Int. Cl.
    *G06F 3/048*     (2013.01)
    *G06T 5/00*     (2006.01)
    *G05G 5/02*     (2006.01)
    *G06F 3/14*     (2006.01)
    *G06F 3/0481*     (2013.01)
    *G09G 5/02*     (2006.01)

(52) U.S. Cl.
    CPC .............. *G06F 3/1423* (2013.01); *G06T 5/00* (2013.01); *G09G 5/022* (2013.01); *G09G 5/026* (2013.01); *G06F 2203/04102* (2013.01); *G09G 2340/12* (2013.01); *G09G 2340/125* (2013.01); *G09G 2340/145* (2013.01); *G09G 2380/12* (2013.01)

(56) References Cited

U.S. PATENT DOCUMENTS

| | | |
|---|---|---|
| 2003/0034901 A1 | 2/2003 | Griffin, III |
| 2004/0158370 A1 | 8/2004 | Le Draoullec et al. |
| 2008/0068399 A1 | 3/2008 | Goss et al. |
| 2008/0262664 A1 | 10/2008 | Schnell et al. |
| 2010/0182165 A1 | 7/2010 | Barry et al. |
| 2015/0339241 A1* | 11/2015 | Warner ................... G06F 13/10 710/74 |

FOREIGN PATENT DOCUMENTS

| | | |
|---|---|---|
| EP | 1762825 A2 | 3/2007 |
| WO | WO 84/01655 A1 | 4/1984 |
| WO | WO 00/68887 A1 | 11/2000 |
| WO | WO 2004/102520 A1 | 11/2004 |
| WO | WO 2004/111816 A2 | 12/2004 |
| WO | WO 2009/081650 A1 | 7/2009 |
| WO | WO 2009/081682 A1 | 7/2009 |
| WO | WO 2010/036128 A2 | 4/2010 |
| WO | WO 2011/099905 A1 | 8/2011 |
| WO | WO 2012/112090 A1 | 8/2012 |

OTHER PUBLICATIONS

Barboni, E., et al., "Model-Based Engineering of Widgets, User Applications and Servers Compliant with ARINC 661 Specification", *Interactive Systems, Design, Specification, and Verification*, Jul. 26, 2005, 25 pages, Springer, Germany.

European Patent Office, Extended European Search Report for Application No. 12886629.0, Feb. 26, 2016, 14 pages, Germany.

International Preliminary Examining Authority, International Preliminary Report on Patentability for International Application No. PCT/SE2012/051104, Jan. 29, 2015, 19 pages, Swedish Patent and Registration Office, Sweden.

International Preliminary Examining Authority, Written Opinion (Third) for International Application No. PCT/SE2012/051104, Dec. 5, 2014, 7 pages, Swedish Patent and Registration Office, Sweden.

International Searching Authority, International Search Report for International Application No. PCT/SE2012/051104, Sep. 27, 2013, 6 pages, Swedish Patent and Registration Office, Sweden.

Lefebvre, Y. "Mastering the ARINC 661 Standard", In Proceedings of SAE 2011 AeroTech Congress and Exhibition, AEROTECH 2011; Toulouse; France; Oct. 18, 2011 through Oct. 21, 2011; 23 pages, [retrieved on Dec. 1, 2014] Retrieved from the Internet: <URL: www.edstechnologies.com/Mailer/jan12/PF3.pdf>.

Verhoeven, R., et al., "Prototyping Interactive Cockpit Applications", In proceedings of 23rd Digital Avionics Systems Conference, Oct. 2004, pp. 9.A.3-1-9.A.3-10, vol. 2, IEEE, USA.

* cited by examiner

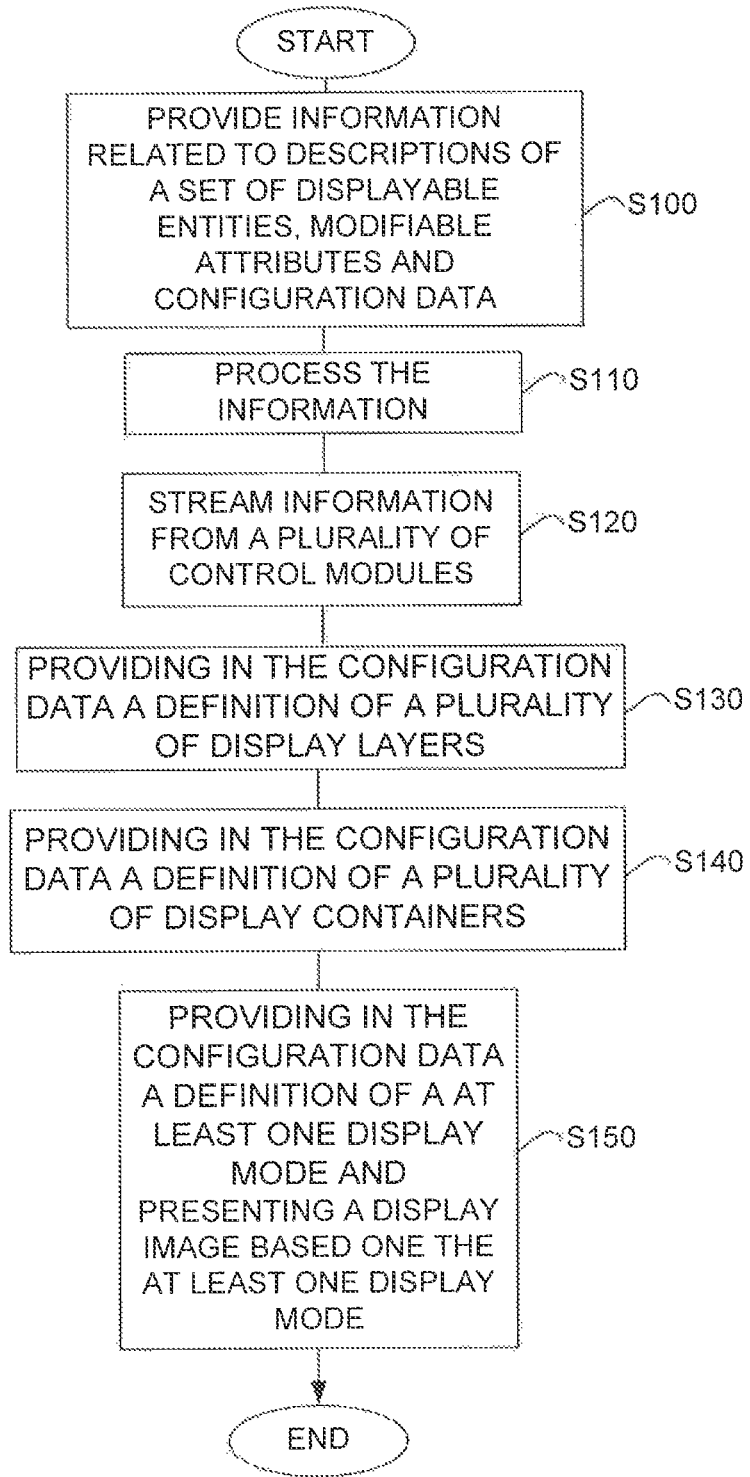

VEHICLE DISPLAY SYSTEM WITH TRANSPARENT DISPLAY LAYER

CROSS REFERENCE TO RELATED APPLICATION

This application is a National Stage Application, filed under 35 U.S.C. §371, of International Application No. PCT/SE2012/051104, filed Oct. 15, 2012, the contents of which are hereby incorporated by reference in their entirety.

BACKGROUND

Related Field

The present invention relates to a system and a method for organizing graphics contents within a display system.

In particular the invention relates to a system and method for organizing graphics contents within an avionics display to allow an operator to readily view a large amount of graphic content simultaneously.

Furthermore, the invention relates to software adapted to perform steps of the organization method when executed on a computer.

Description of Related Art

In control systems of today, developments in digital technology have enabled complex functionality. However as a direct result from the development, the need of additional system capacity and functionality provided by software and various components such as sensors, processors, display units, data buses and memory units is increasing.

Real-time systems for critical control applications, wherein typically data from sensor/s are acquired, communicated and processed to provide a control signal to an actuator pose strict demands regarding bandwidth, data delivery time, redundancy, fail-safety and integrity. Failure to meet one or several of these demands can in applications including "brake-by-wire" or "steer-by-wire" prove potentially dangerous.

One such area wherein reliable high-speed real-time execution and communication of data is of outmost importance is within avionics systems. Advances in technology during late 1960 and early 1970 made it necessary to share information between different avionics subsystems in order to reduce the number of functional modules. A single sensor such as a position sensor provided information to weapon systems, display system, autopilot and navigation system.

The possibilities gained by the development within the field of computer technology have also increased the amount of processed data available to a pilot containing situation awareness information, relevant for decision making. This in combination with presentation of flight critical data, related to for example navigation, adds to the number of interactive presentations that are necessary and/or desired to provide in a cockpit display system.

Typically avionics subsystems, such as sensors, actuators, controllers and display units communicate with each other using standardized communication protocols. The commercial Aeronautical Radio Inc. (ARINC) 661, specification is a civil protocol standard for the definition of a cockpit display system and its communication with a client system arranged to manage avionics functions. Each independent client system is provided with a separate layer of a display surface. The protocol provides a safe implementation for several independent client systems to simultaneously present data on a single display surface of a display system. Furthermore implementation of the ARINC 661 facilitates software certification in accordance with the Radio Technical Commission for Aeronautics (RTCA) DO-178B guidance document. Software re-certification resulting from system modifications such as additions of new client systems or modifications to the existing client systems is also facilitated.

However, the display systems according to prior art tends to have a limited ability to achieve flexible display representations i.e. modifying pre-existing display information in response to for example changed operating conditions requiring a different set of information entities. The display systems according to prior further tends to diminish the ability of an operator of the display system to discriminate between different display information entities or require additional display screen space. This is especially the case when the display system is arranged to display a large amount of different information entities and/or when there exists a need to change display information.

Accordingly, there is a need to present improvements in the art of avionics and displays.

It is therefore an objective of the present invention to provide a display system, a display method and a computer program performing said display method, that are improving flexibility in regard of organizing display of information that also facilitate the ability of an operator to be able to simultaneously view a large amount of information of choice using a limited display area and to discriminate between different information entities.

BRIEF SUMMARY

This objective is achieved according to the present invention by a display system. The system having display means comprise at least one display unit arranged to present at least one display image. The display means further comprise at least one memory unit comprising information related to descriptions of a set of default graphics display objects, at least one modifiable attribute of at least one default graphics display objects of the set of default graphics display objects and configuration data. The display means further comprise at least one processor arranged to process the information of said at least one memory unit to control the at least one display image. The display system further comprise a plurality of control modules arranged to stream information related to the at least one modifiable attribute to said at least one memory unit to enable the at least one processor to update the at least one modifiable attribute. The configuration data is arranged to define at least one transparent display layer. Each of said at least one transparent display layer being arranged to define a display region positioned within one or more display window of said at least one display unit. The configuration data is further arranged to define at least one transparent display container associated to the at least one transparent display layer. Said at least one transparent display container being positioned in a portion of said display region. Each of said at least one transparent display container having at least one default graphics display object of the set of default graphics display objects positioned within the portion of the display region. The configuration data is further arranged to define at least one display mode. Each of said at least one display mode comprising a predetermined selection of one or more of said at least one transparent display container of one or more of said at least one transparent display layer to provide for each of the at least one display mode a predetermined combination of the at least one default graphics display object of one or more of the at least one transparent display container of the one or more of said at least one transparent display layer in order to form the at least one display image based on the at least one processor processing the information related to the at least one display mode.

By this is achieved a system wherein display of information i.e. the at least one display image presented by the display system can be configured in a flexible fashion using the at least one transparent display layer, the at least one transparent display container and the set of default graphics display objects. By positioning one or more default graphics display object of the set of default graphics display objects such as a set of widgets in the at least one transparent display container of one or more of the at least one transparent display layer and since both the at least one display container of the at least one display layer and the at least one display layer being transparent i.e. having a transparent background the at least one display image can be formed by layering information from one or more of the at least one transparent display container of one or more of the at least one transparent display layer according to a predetermined selection corresponding to each of the at least one display mode. This means that information from a large number of default graphics display objects such as for example widgets displaying information can be organized and simultaneously displayed in a single display window of the at least one display unit by arranging the at least one display mode to cause the display to present information in the single display window corresponding to information displayed by a number of the at least one default graphics object of choice. This removes the limitations according to prior art display systems which need to partition information to be displayed by statically arranging the information to be displayed in multiple display pages available via toggling, multiple display windows and/or multiple display units.

It is further achieved that the display system facilitates creation of additional display images to be presented. This is achieved by means of that additional display modes can be defined by defining new combination of already existing display content i.e. new combinations of contents of predefined transparent display containers and/or transparent display layers instead of having to create additional display images by defining display content from the beginning i.e. starting with a description of an empty display image as described by prior art display systems.

The system is in one option further characterized in that each of said at least one transparent display container being controllable to assume a visible or a invisible state according to the predetermined selection, wherein said visible or invisible state is arranged to affect the visibility of each of the at least default graphics display object associated to the at least one transparent display container being controlled.

By this is achieved a highly flexible display system wherein display content i.e. each of the at least one default graphics object associated to each of the at least one transparent display container of one or more of the at least one transparent display layer can be made visible or not based on controlling the state of each of the at least one transparent display container. This means that the invisible or visible state of the at least one display container affects what display content is visible or not as determined by the at least one display mode corresponding to the predetermined selection. By defining the at least one display mode to include a predetermined selection of the at least one default graphics object of one or more of the at least one transparent display container one or more of the at least one transparent display layer any combination of contents from the at least one transparent display container of any of the at least one transparent display layer can be arranged to form the at least one display image presented to a user of the display system.

The system is in one option further characterized in that the configuration data is arranged to define a plurality of transparent display containers associated to one or more of the at least one transparent display layer.

By this is achieved a display system wherein a limited display area can be utilized more effectively in order to display more information of choice simultaneously by means of providing more information i.e. transparent display containers with associated default graphics display objects to select from when defining the at least one display mode affecting what information is presented in the at least one display image.

The system is in one option further characterized in that the configuration data is arranged to define a plurality of transparent display layers.

By this is achieved a display system wherein a limited display area can be utilized more effectively in order to display more information of choice simultaneously by means of providing more information i.e. transparent display layers with associated one or more transparent display containers with associated default graphics display objects to select from when defining the at least one display mode affecting what information is presented in the at least one display image.

The system is in one option further characterized in that the configuration data is arranged to define a plurality of display modes.

By this is achieved a display system wherein a number of display modes can co-exist in the display system. Each of said number of display modes defining a predetermined selection of available display contents i.e. a predetermined selection of transparent display containers with associated at least one default graphics object.

The system is in one option further characterized in that the at least one display mode is selectable by means of a user interface or automatically selected based on information related to current operation of a vehicle arranged to host the display system.

By this is achieved a system wherein the display contents effectively can be selected and/or adapted based on the current operation of a vehicle hosting the display system.

The system is in one option further characterized in that the at least one processor is arranged to present the at least one display image by super positioning overlapping transparent display layers and/or portions thereof, based on a predetermined layer priority scheme arranged to determine the order of visibility among the plurality of transparent display layers.

By this is achieved a robust system wherein display content/information associated to different criticalities can be safely handled based on using different display layers for different display content and wherein the relative order of visibility among the plurality of display layers and associated at least one default graphics object are ensured based on the predetermined layer priority scheme.

The system is in one option further characterized in that the at least one processor is arranged to present the at least one display image by super positioning overlapping transparent display containers and/or portions thereof, based on a predetermined container priority scheme arranged to determine the order of visibility among a plurality of transparent display containers associated to each of the at least one transparent display layer.

By this is achieved a robust system wherein display content/information associated to different criticalities can be safely handled based on using different display containers within each display layer for different display content and wherein the relative order of visibility among the plurality of display containers are ensured based on the predetermined layer priority scheme.

The system is in one option further characterized in that each of at least one transparent display layer being controllable to assume a visible or a invisible state according to the predetermined selection, wherein said visible or transparent state is arranged to affect the visibility of each of the at least default graphics display object associated to each of the at least one display container associated to the at least one transparent display layer being controlled.

By this is achieved a highly flexible display system wherein display content i.e. each of the at least one default graphics object associated to each of the at least one transparent display container of one or more of the at least one transparent display layer can be made visible or not based on controlling the state of each of the at least one transparent display layer. This means that the invisible or visible state of the at least one display layer affects what display content, e.g. what at least one default graphics object, is visible or not as determined by the at least one display mode corresponding to the predetermined selection. By defining the at least one display mode to include a predetermined selection of the at least one default graphics object of each of the at least one transparent display container of one or more of the at least one transparent display layer any combination of contents from the one or more of the at least one transparent display layer can be arranged to form the at least one display image presented to a user of the display system.

The system is in one option further characterized in that the configuration data is arranged to define at least one predetermined graphics attribute for each of at least one first default display graphics object of the set of default graphics objects, wherein said at least one predetermined graphics attribute each being arranged to determine one or more graphics property of each of said at least one first default graphics display object.

By this is achieved a system wherein a limited display area can be utilized more effectively in order to display more information simultaneously without compromising the ability of an operator to discriminate between the information entities.

The system is in one option further characterized in that the at least one predetermined graphics attribute comprises one or more graphics attribute selected from a group of graphics attributes comprising a colour, an outline colour, a shape and a size.

The system is in one option further characterized in that the at least one predetermined graphics attribute for each of said at least one first default graphics display object is arranged to determine the size and/or shape of each of the at least one first default graphics display object relative to a size and/or shape of one or more of the other default graphics display objects of the set of default graphics display objects so as to enable each default graphics display object of the set of default graphics display objects at least being partially visible irrespectively of selected display mode.

By arranging the size and/or shape of default graphics display objects, i.e. the portion/area of the display window covered by the default graphics object, relative to the size and/or shape of other default graphics display objects the default graphics object can be placed in different transparent display layers/containers wherein the transparent display containers/layers may overlap each other without risking that information provided from default graphics objects being overlapped i.e. not being visible.

The system is in one option further characterized in that the configuration data is arranged to define the at least one predetermined graphics attribute based on a relative position of one or more default graphics display object of the set of default graphics display objects, the predetermined layer priority scheme and/or the predetermined container priority scheme.

The system is in one option further characterized in that the display system is compliant with the ARINC 661 specification.

The system is in one option further characterized in that the at least one memory unit is arranged to buffer the information streamed from the plurality of control modules that are associated to the at least one modifiable attribute of the at least one default graphics display object of the set of default graphics display objects of each of the at least one transparent display container of each of the at least one transparent display layer currently being in the invisible state.

By this is achieved a system wherein continuously refreshed information from transparent display layers currently in the invisible state or in a inactive state are available to the display system without time-delay such that a quick time response is enabled when activating the currently inactive display layers such as for example by switching from a display mode to another display mode.

This objective is also achieved according to the present invention by a method for a display system comprising the step of providing information to at least one memory unit associated to display means. The information relating to descriptions of a set of default graphics objects, at least one modifiable attribute of at least one of default graphics display object of the set of default graphics display objects and configuration data. The method further comprising the step of processing in at least one processor the information of said at least one memory unit to control at least one display image to be presented on at least one display unit. The method further comprising the step of streaming information from a plurality of control modules, said information relating to the at least one modifiable attribute to said at least one memory unit to enable the at least one processor updating the at least one modifiable attribute. The method further comprising the step of providing in the configuration data a definition of: at least one transparent display layer, each of said at least one transparent display layer defining a display region positioned within one or more display window of said at least one display unit; at least one transparent display container associated to the at least one transparent display layer, said at least one transparent display container being positioned in a portion of said display region, wherein each of said at least one transparent display container having at least one default graphics display object of the set of default graphics display objects positioned within the portion of the display region; and at least one display mode, each of said at least one display mode comprising a predetermined selection of one or more of said at least one transparent display container of one or more of said at least one transparent display layer to provide for each of the at least one display mode a predetermined combination of the at least one default graphics display object of one or more of the at least one transparent display container of the one or more of said at least one transparent display layer in order to forming the at least one display image based on the at least one processor processing the information related to the at least one display mode.

The dependent claims define optional characterizing features corresponding to those described in relation to the system.

This objective is also achieved by a computer programme comprising a programme code for performing the above described method steps, when said computer programme is run on a computer.

This objective is also achieved by a computer programme product comprising a program code stored on a computer readable media for performing the above described method steps, when said computer programme is run on the computer.

This objective is also achieved by a computer programme product directly storable in an internal memory of a computer, comprising a computer programme for performing the above described method steps, when said computer programme is run on the computer.

BRIEF DESCRIPTION OF THE FIGURES

FIG. 6. shows a flow diagram of a method for the display system according to an example of the present invention.

DETAILED DESCRIPTION OF VARIOUS EMBODIMENTS

The present invention is described to a large extent in this specification with reference to a system and method for controlling avionics of an aerial vehicle using a display system. However, various different applications are possible, e.g. for use in land, sea or space vehicles. Also the present invention may be applied to display systems of various generic and/or dedicated computer system. The vehicles may be military vehicles such as for example fighter jets, destroyers, un-manned combat aerial vehicles (UCAV:s) or civilian/commercial vehicles such as for example cars, commercial airliners, cruise ships, cargo ships, satellites or other types of vehicles known within the art. In case the vehicles relate to un-manned vehicles the present invention may be applied to a remote control station of the un-manned vehicle.

Figure 1:
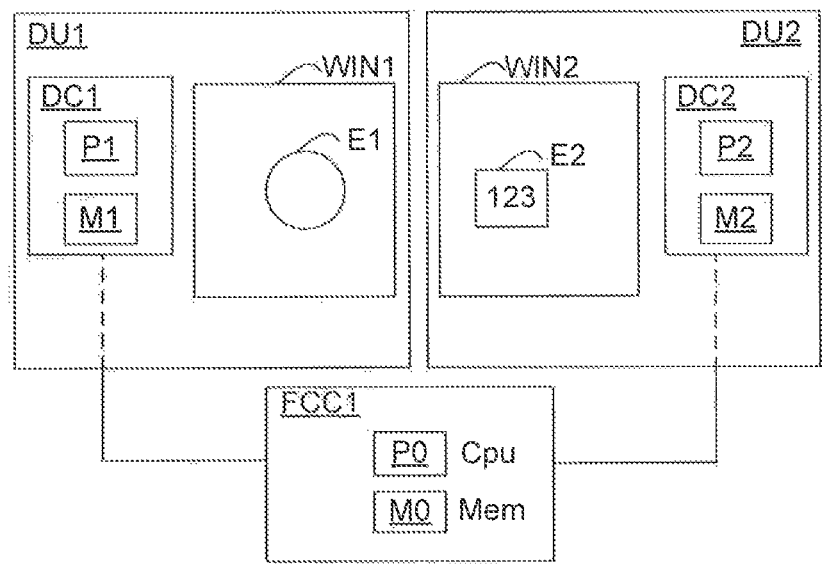
FIG. 1. shows schematically a block diagram of a prior art display system.

In FIG. 1 a first typical display system according to prior art is illustrated. The first typical display system comprises a flight computer FCC1, such as a flight critical computer or portions thereof operatively coupled to a first display control unit DC1 and a second display control unit DC2. The flight critical computer FCC1 may be arranged to process information by means of a processor P0 and a memory unit M0 so as to perform various operations related to supervision and control of an aerial vehicle. The display control unit DC1, DC2 is arranged to control the operations of a first display unit DU1 and a second display unit DU2 respectively, such as for example a flight display. The display control unit DC1, DC2 may comprise a processor P1, P2 arranged to process information provided from the flight control computer. The display control unit may comprise a memory unit M1, M2 arranged to store information related to information provided from the flight control computer, said information relating to processing instructions for the processors associated to the display control unit and/or information processed by the processor associated to the display control unit. The first and second display unit DU1-DU2 may comprise a display window WIN1-W2, each arranged to provide an individual display representation on a predetermined portion of a display surface of the respective display units DU1, DU2 in which associated graphics can be displayed. Each window may be provided display commands relating to displaying one or more graphics object. In the illustrated example a first window WIN1 is arranged to display a graphic object E1 comprising symbology and a second window WIN2 is arranged to display a graphic object E2 comprising a numerical object.

Figure 2:
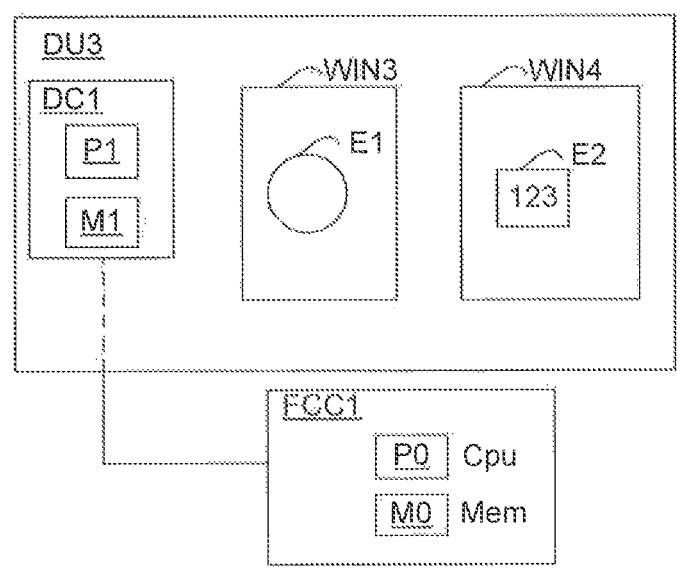
FIG. 2. shows schematically a block diagram of an alternative prior art display system.

In FIG. 2 a second typical display system according to prior art is illustrated. The first typical display system comprises a flight computer FCC1 such as a flight critical computer or portions thereof operatively coupled to the first display control unit DC1. In the illustrated example the first display control unit DC1 is arranged to control the operations of a third display unit DU3. The third display unit DU3 may comprise a partitioned display window WIN3-WIN4, each partitioned display window WIN3-WIN4 arranged to provide a an individual display representation on a predetermined portion of the display unit DU3 in which associated graphics can be displayed. Each partitioned window may be provided display commands relating to displaying one or more graphics object. In the illustrated example a third window WIN3 is arranged to display the graphic object El comprising symbology and a fourth window WIN4 is arranged to display the graphic object E2 comprising a numerical object.

In the typical display systems display of multiple information entities typically rely on dedicated display portions assigned to each information entity and/or menus and tables that enable control of which of the information entities that are desired to be visible. However, even though the typical display systems may be arranged to comprise menus to enable toggling between different static display representations in each window, the typical display systems are still reliant on that each information entity is positioned in a predetermined fashion on a dedicated display portion either in a single display page or in multiple display pages available for view via toggling. This means that if an operator desires various display information from more than one display page simultaneously several windows are required.

Hence, in order to display multiple information comprising one or more graphics object in one or more partitioned display window of the typical display system having limited display surface typically require that one or more of the graphics object is provided with a separate partitioned display window. This is especially the case when one or more of the graphics objects are arranged to be user interactive and the operator i.e. user of the system need to interact with the one or more graphics object and the one or more graphics objects are closely spaced apart. Interaction with the one or more graphics objects which are closely spaced apart may lead to confusion as to which of the one or more graphics objects the operator is interacting with.

The present invention provides means for facilitating flexible display of multiple types of information of various criticalities associated to one or more applications in one or more physical display unit comprising one or more partitioned display window each having a limited display surface in which to display information.

The person skilled in the art will recognize that any computer system or systems that comprises suitable programming and/or processing means for operating in accordance with the disclosed method falls within the scope of the present invention. The suitable programming means may comprise any means for controlling a computer system to cause the computer system to execute the steps associated to the inventive method. The suitable programming means may for example comprise one or more processor or logic circuit coupled to a computer memory or electronic circuits which have the ability to store data such as for example machine readable instructions and/or program instructions. The computer memory being arranged to store the machine readable instructions and/or the program instructions for execution by a processing unit such as for example the processing means.

The present invention may also in one example be performed by means of a computer program product, such as a ROM (read only memory), for example a CD-ROM, DVD, semiconductor ROM, FLASH memory or other suitable recordable medium capable of storing machine readable instructions for use in any suitable data processing system. Thus, any computer system comprising means for performing the steps of the method of the present invention stored on the computer program product is capable of executing said steps.

The person skilled in the art will also understand that apart from implementing the method of the present invention in any computer system the present invention can as well be implemented as separate hardware components, a single hardware component or firmware or any combination thereof.

Figure 3:
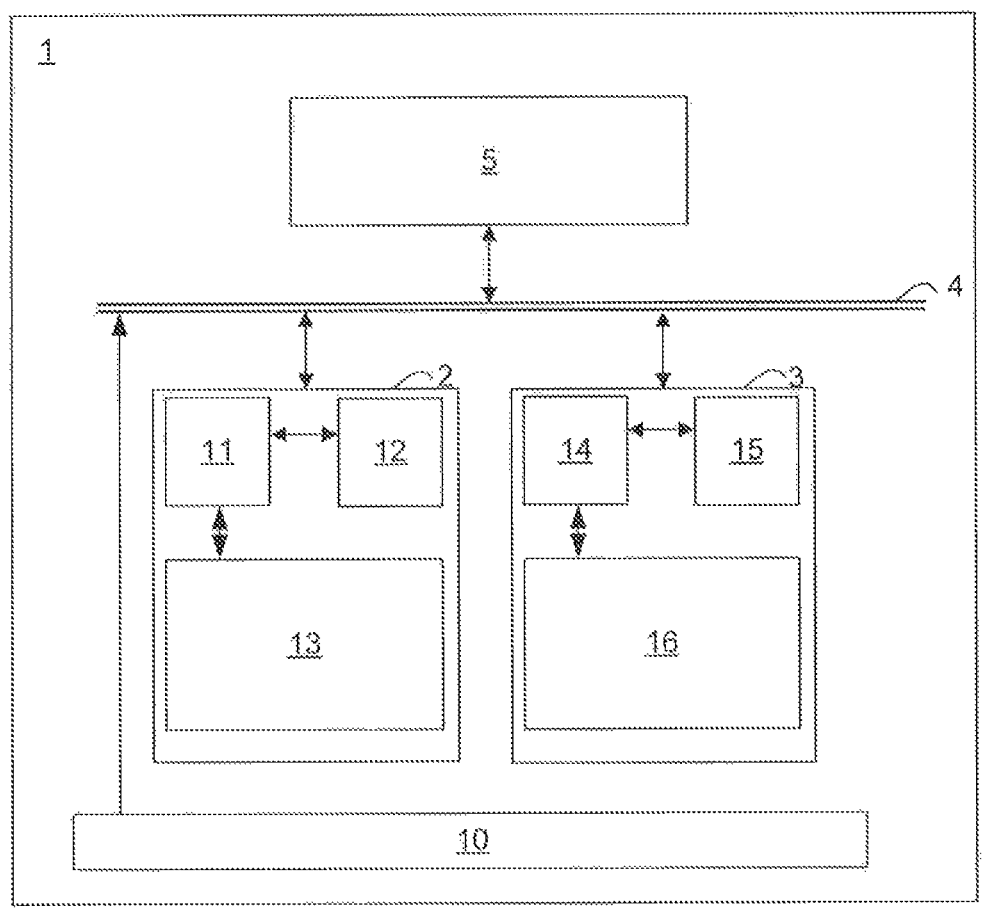
FIG. 3. shows schematically a block diagram of a display system according to an example of the present invention.

With reference to FIG. 3 a vehicular display system 1, adapted to be mounted in an aerial vehicle is provided according to an example of the present invention is shown. The vehicular display system 1 comprises at least one display, e.g. flight display 2, 3 arranged to provide means for at least one operator of said vehicular display system 1 to interact with the system, in order to supervise and control the operation of the aerial vehicle.

Figure 4:
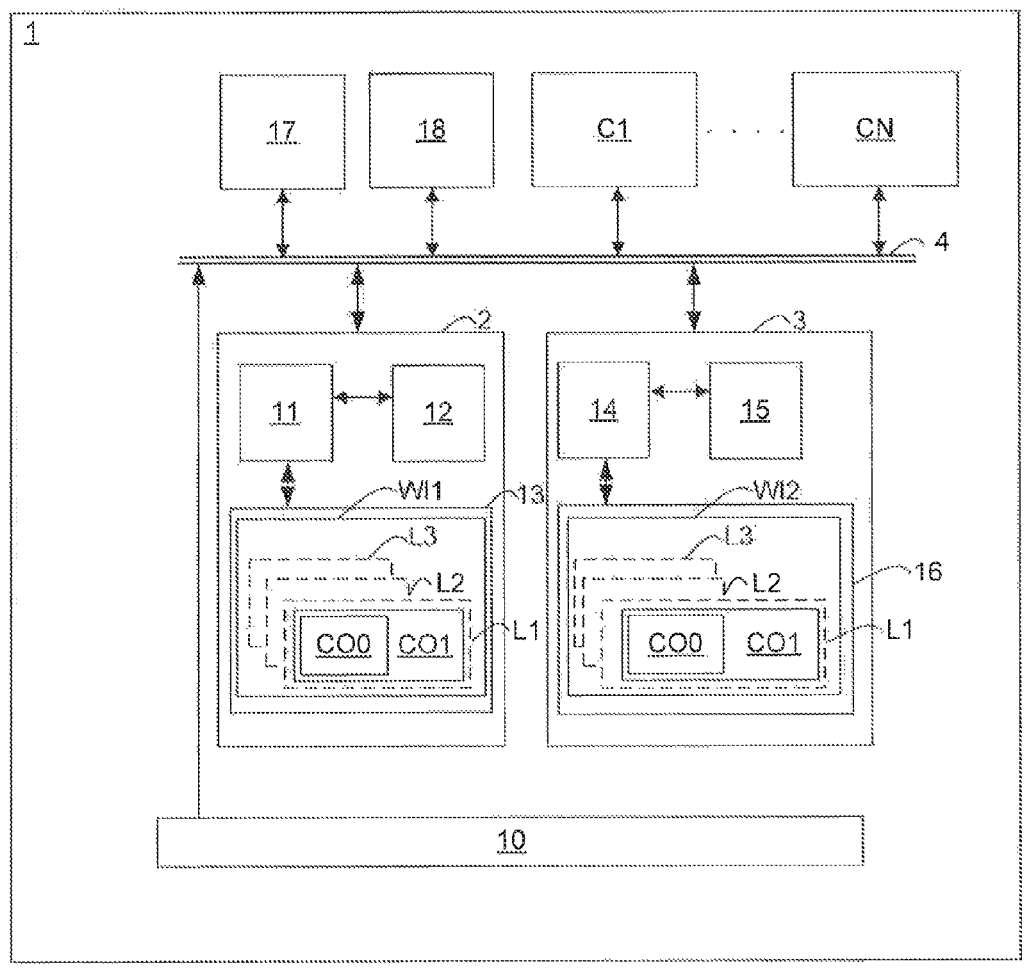
FIG. 4. shows schematically a block diagram of a display system in more detail according to an example of the present invention.

In the shown example with reference to FIG. 4 the vehicular display system 1 according to an example of the present invention comprises two flight displays 2, 3, such as two multi functional display units (MFDU:s). Each of the flight displays 2, 3 may comprise at least one display processor 11, 14 arranged to process data, received via a communication bus 4. The processing of the received data can be based on configuration data stored in at least one memory 12, 15, coupled to the at least one display processor 11, 14. The at least one display processor 11, 14 may for example be a microprocessor, programmable device, Field Programmable Gate Array (FPGA) or any other processing device known within the art. The at least one memory may be a Random Access Memory (RAM) unit and/or a non-volatile memory unit such as a Read Only Memory (ROM), optical disc drive, magnetic disc drive, flash memory, Electrically Erasable Read Only Memory (EEPROM) or any combination thereof. The at least one memory unit may comprise instructions to enable the at least one processor to provide services enabling the inventive methods according to examples of the present invention. The instructions may for example be associated to at least one operative system (OS) such as for example a real-time OS (RTOS) compliant with the Aeronautical Radio Inc. (ARINC) 653 specification enabling ARINC 653 compliant services to be provided. The services provided from the OS may be arranged to provide means for running application programs. The application programs may be stored on the at least one memory unit. The communication bus 4 may be bi-directional and based on protocols such as the Institute of Electrical and Electronics Engineers (IEEE) Ethernet, IEEE 1394 Firewire, MIL-STD-1553, ARINC 664, ARINC 429, other protocols known in the art or any combination thereof. The received data may be data transmitted from at least one flight control computer (FCC) 5 arranged to control functions of the aerial vehicle such as propulsion, flight controls, payload, hydraulics and power. The received data may be related to properties of displayable entities. The received data may comprise for example a parameter associated to a sensor reading, position of an actuator and/or a position received by an ADS-B transponder.

Thus, each processing device is arranged to process the received data based on the configuration data stored in the memory 12, 15, so as to instantiate displayable entities. Further, each processing device is in one example arranged to modify properties associated to the displayable entities on basis of the received data.

The displayable entities may be a number of predefined graphical elements, and/or grouping elements. As an example the displayable entities may be one or more widgets. The displayable entities may further be static, dynamic and/or interactive. Examples of displayable entities may be lines, arcs, rectangles, containers and pushbuttons. The interactive displayable entities may comprise a plurality of internal states such as in the case of the pushbutton which may comprise several graphically different states related to the when the button is in idle state, subjected to a marker passing such as a mouse-over or engaged by said marker.

As an example, a composition of the displayable entities may form a graphical representation of an altitude meter. The graphical representation of the altitude meter may comprise a plurality of graphical objects such as a circle with a plurality of evenly distributed ticks, each crossing the circle perpendicularly and associated numbering, providing an altitude scale. A pointer may be arranged to point from the centre of the circle to the current altitude provided by received data in accordance with the scale. The property of the above defined displayable entity may be related to altitude, provided from the FCC 5, which may be arranged to perform subsequent sensor readings of current altitude. Other properties of the displayable entities may be related to colouring, size and positioning.

The FCC 5 may be arranged to provide data via the communication bus 4 at a periodic basis and/or based on detected events, such as event relating to when subsequent data exceed predetermined thresholds.

The communication bus 4, may in one example be a switched Ethernet network. The switched Ethernet network may comprise one or more data switches. The topology of the Ethernet network may for example be a dual redundant topology comprising two data switches and thereby also comprise two independent data paths along which data may be communicated to each device attached to the network.

In one example the communication bus 4 may be a switched Ethernet network arranged in broadcast mode, based on implementing broadcast address.

In one example the communication bus 4 may be a switched Ethernet network arranged in point-to-multipoint mode based on implementing at least one multicast address.

The configuration data stored in the memory 12, 15 comprises predetermined information relating to predetermined display content, configuration of the display content and information relating to a communication protocol. The configuration data may further comprise information related to information for interpretation of the received data such as a rendering engine. In one example the rendering may be based on OpenGL or a flight critical subset thereof.

The flight displays 2, 3 may further each comprise at least one physical display surface 13, 16 in operable connection with the respective display processor 11, 14, The display surface 13, 16 can for example be implemented as a liquid crystal display (LCD), organic light emitting diode (OLED), cathode ray tube (CRT) or using any other suitable display surface technique known in the art.

In one example the physical display surface 13, 16 may depending on intended use and/or physical properties be configured as a cockpit display unit (CDU), head mounted display (HMD), head down display (HDD), head up display (HUD), side display (SD), data link control display unit (DCDU) or any other display configuration known in the art.

In one example the flight displays 2, 3 comprising the physical display surfaces 13, 16 may be arranged in a vehicle control station such as in a cockpit of the aerial vehicle.

In another example one flight display 2 may be arranged in a front cockpit and the other flight display 3 may be arranged in a rear cockpit of a two seated aerial vehicle.

The flight displays 2, 3 are further configured to receive user inputs via the communication bus 4 from an operator of the avionics control system by means of at least one user interface 10. The user interface is for example at least one keyboard, bezel key, mouse, joystick, trackball or rotary knob or a combination thereof. The physical display surfaces 13, 16 may further comprise a resistive or capacitive touch screen layer to enable user interactions.

The flight displays 2, 3 may further be arranged to forward received user inputs to the FCC 5, in order for the FCC 5 to respond to user inputs. As an example the operator may detect that a parameter associated with a sensor reading of a specific engine component exceeds a predetermined temperature threshold and respond accordingly, by providing a command counteracting the condition. The counteracting command comprises for example providing an actuator of an engine cooling system with a command to increase cooling efficiency.

In one example the flight displays 2, 3 may be assigned to visualising either a primary flight display (PFD) or a Navigation display (ND). The PFD may be arranged to visualize indicators relating to characteristics of the aerial vehicle hosting the control system 1, such as for example air speed, attitude, altitude and/or magnetic heading. The ND may be arranged to visualize indicators relating to characteristics of the aerial vehicle hosting the control system 1, such as for example map, flight path and other aerial vehicles detected in the surrounding air space.

In another example at least one of the flight displays 2, 3 may be assigned to simultaneously visualising both a PFD and a ND.

In one example explained with reference to FIG. 4, the at least one display processor 11, 14 of the vehicular display system 1 may be arranged to process the configuration data comprising a predetermined library of displayable entities and a plurality of configuration files, also referred to as layer definition files, stored in the memory 12, 15. The predetermined library of displayable entities may comprise a predetermined list of displayable entities with associated descriptions relating to graphic appearance and behaviour. As an example the predetermined library of displayable entities may be a database of predefined widgets. The layer definition files may each comprise configuration information relating to a selection of displayable entities to instantiate with associated initial properties. Each of the layer definition files may comprise information describing the displayable entities, constituting each of a set of display layers L1-L3, displayable in at least one display window WI1-WI2 of the physical display surfaces 13, 16 of the flight displays 2, 3. The display layers are the highest level container in a hierarchical structure of the displayable entities i.e. the display layers are graphical layers associated with an application inside a display window. By processing the layer definition files, a set of display layers L1-L3 each comprising one or more specific instances of the displayable entities may be provided in each of the at least one display window of the physical display surfaces 13, 16. A number of client systems C1-CN may be arranged to handle the logic of the displayable entities. The handling of the logic may comprise determining and providing the parameters associated to the properties of the instantiated displayable entities during system run-time. As an example one or more of the client systems C1-CN may be arranged to provide one or more of the instantiated displayable entities with properties related to sensor readings or positions of actuators. As an example, the logic of one of the client systems C1-CN may be arranged to alter colour of one of its associated instantiated displayable entities upon detection of an intruding aerial vehicle breaching a proximity threshold. Each of the number of client system C1-CN may be associated to one or more of the set of display layers L1-L3. Each layer of the set of display layers L1-L3 may be associated to one of the client systems C1-CN. In this example each of the layer definition files further define a set of graphic containers CO0-CO1 associated to one or more display layers of the set of display layers L1-L3. The set of display containers may comprise one or more graphics container. Each of the one or more graphics container is arranged to group a number of displayable entities. In more detail each of the one or more graphics container group a number of displayable entities together within the display layer in which the respective graphics container is defined. This enables jointly managing at least one of the following attributes position, visibility and interactivity of a plurality displayable defined within the respective graphics container of its associated display layer. Each graphics container define a portion of the display layer in which the graphics container is defined by means of the display layer definition file. Each of the displayable entities defined within a specific graphics container is defined with regard to position relative to a reference position of the graphics container. This means that by modifying the position of the specific graphics container the position relative the physical display surface and/or display window of all displayable entities associated to the specific graphics container is also modified.

In this example each of display layer of the set of display layers and each graphical container of the set of graphical containers are transparent. This means that only the displayable entities positioned in the each of the display layers and/or in each of the graphic container are visible whereas the surface defined by said display layers or graphic containers surrounding said displayable entities are transparent.

It is to be understood that the exemplified number of layers in the set of display layers L1-L3 and/or the number of graphic containers CO0-CO1 in the set of graphic containers, available to the system 1 is by no means limited to the exemplified numbers with reference to FIG. 4. The system 1 may as well comprise at least as many of the display layers as the corresponding number of available client systems C1-CN, determined to have a need for displaying information. The system 1 may also comprise as at least as many graphics containers as the number of display layers.

In one example one or more the physical display surfaces 13, 16 may be partitioned into a plurality of individual display windows WI1-WI2 so as to enable displaying different graphics contents and/or different configurations of graphics contents within one and the same display surface.

In one example the number of display layers may be within the range of 1-255 such as for example 20.

In one example the number of graphics containers may be within the range of 1-255 such as for example 60.

In one example each of the client systems C1-CN may be arranged to transmit data to the flight displays 2, 3, using point-to multipoint communication wherein said data may be related to the properties of the instantiated displayable entities. The client systems C1-CN may be implemented in software and hosted on one or more avionics computers such as the FCC 5.

By transmitting data based point-to-multipoint i.e. multicasting data to the flight displays 2, 3 associated to properties of the displayable entities associated to the respective display layers L1-L3, the operation of adding one or several flight displays 2, 3 to the vehicular display system 1 is simply to provide the predetermined library of displayable entities and duplicates of the pre-existing layer definition files to the memory of the additional one or more flight displays. Hence, there is no need for modifications of the existing client systems C1-CN in connection to adding additional flight displays 2, 3 to the existing system 1.

In one example the definition files may be created using the format extensible mark-up language (XML), on basis of the ARINC 661 specifications. The definition files may further be compiled from the XML format to binary and subsequently uploaded to the memory 12, 15 of the flight display 2, 3.

In one example the predetermined library of displayable entities may be based on the widget library as defined by the ARINC 661 specifications. In this example the client systems C1-CN may be user applications UA:s and the layer definition files may be user applications layers definitions UALD:s.

In one example one or more of each of the graphical containers of the set of container may be a container widget as defined by the ARINC 661 standard such as for example a "Basic container".

In one example a display server can be provided in the control system 1. The display server may provide a set of services related to handling of user input data, instantiating displayable entities and handling of hierarchy of the displayable entities associated to the plurality of layers and/or the set of graphic containers C00-C01 based on the configuration data. The display server may be implemented in software executed on the at least one display processor 11, 14 of the flight displays 2, 3. The operating instructions for the display server may be provided by information stored on the memory 12, 15.

In one example with further reference to FIG. 4 a mode control unit 17 is provided in the vehicular display system 1. The mode control unit 17 is arranged to receive data messages related to user inputs. In response to specific user inputs the mode control unit 17 can be arranged to transmit a data message to a display server, related to controlling a visibility parameter associated to the respective layers L1-L3 and/or to the respective graphics containers C00-C01. The mode control unit 17 may be a centralized unit implemented in software as a user application. The mode control unit 17 may further be adapted to the ARINC 661 specification.

In one example the mode control unit 17 is arranged as a master client system. This means that the mode control unit 17 act as master over the client systems C1-CN, operating as slaves under the mode control unit 17.

As an example a first 2 and/or a second flight display 3 may be configured to each display a set of three stacked i.e. super positioned display layers L1-L3. A first display layer L1 and a second display layer L2 of the set of stacked display layers L1-L3, may be associated to one or more of the displayable entities, forming a PFD. The PFD may be formed by a first number of graphics containers associated to the first display layer and a second number of graphics containers associated to a second display layer. Said first number of graphic containers having a first subset of displayable entities and said second number of graphic containers having a second subset of displayable entities. A third display layer L3 may be associated to one or a composition of the displayable entities constituting a ND. The ND may be formed by a third number of graphics containers associated to the third display layer. Said third number of graphic containers having a third subset of displayable entities. The order of visibility of the display layers, e.g., which display layer appears on top of other display layers may be hierarchically defined starting from display layer L1 to display layer L3, based on implementing a priority scheme. The parameters referring to hierarchically defined order of visibility/relative visibility between layers may be statically specified in the respective display layer definition file associated to the respective layer L1-L3. Apart from the order of visibility, each display layer L1-L3 and/or graphics container C00-C01 may comprise a parameter associated to absolute visibility, with selectable values TRUE or FALSE. Thus, with the visibility parameter set to TRUE on all the display layers L1-L3 and on all associated graphics containers, only the PFD will be visible to the operator and the ND will not be seen provided that the third subset of displayable entities are positioned under the first and second subset of displayable entities. By providing a user input associated to the mode control unit 17, for example by using the user interface 10, the mode control unit 17 may in response be arranged to transmit a message, informing a display server associated to the first flight display 2 to set the visibility parameter of the first L1 and second L2 display layers or the visibility parameter of each of the first number and second number of graphic containers to FALSE. By manipulating the visibility of the first L1 and second L2 display layers or the contents thereof in the form of the visibility of the graphics containers, only the ND and not the PFD will be seen by the operator in the first flight display 2. Depending on the application the displayable entities associated to forming the PFD may be positioned in a separate portion of the physical display surface with respect to the displayable entities associated to forming the ND. Alternatively the displayable entities associated to forming the PFD may be positioned in a portion of the physical display surface partially or fully covering the displayable entities associated to forming the ND. This means that information in the form of displayable entities positioned into graphical display containers associated to display layers can be partially or fully visualised simultaneously or in an alternating fashion by means of the position of each of the displayable entities relative to each other and by means of control of the visibility of the display layer and/or graphics container having the respective displayable entity positioned therein.

In one example there is provided a predetermined selection of a plurality of display modes. The term display mode refers herein to a particular combination of display layers L1-L3 and display containers CO0-CO1 selected from the set of display layers L1-L3 and the set of graphics containers CO0-CO1, wherein the particular combination of display layers and graphics containers CO0-CO1 is arranged to be displayed simultaneously at predetermined positions or portions of the at least one display window WI1-WI2 and/or physical display unit 13, 16. Each of the plurality of display modes may be configured by providing additional configuration data arranged to be processed by the processing devices 11, 14. The additional configuration data may be stored on the memory 12, 15. The additional configuration data comprise display mode definition files each comprising one or more references to display layer and graphics container identification parameters defined in each of the layer definition files. Each of the display layer identification parameter is arranged to uniquely define each display layer of the set of display layers L1-L3. Each of the graphics container identification parameter is arranged to uniquely define each graphics container of the set of graphics containers CO0-CO1.

The predetermined selection of the plurality of display modes may be preconfigured by means of arranging one or more instances of displayable entities in predetermined positions and/or portions of one or more graphics container of the set of graphics containers CO0-CO1. The selection of predetermined display modes may further be preconfigured by means of arranging each of said one or more graphics container in one or more predetermined portion of at least one display layer of the set of display layers L1-L3. The one or more predetermined portion of at least one display layer may be arranged to cover one or more predetermined portion of the display area formed by the respective physical display surface 13, 16 or display windows WI1-WI2. In order to configure the contents of each display mode of the predetermined selection of the plurality of display modes each display mode may be defined by the above described additional configuration data identifying which one or more graphics container of which one or more display layer that constitute each of said display modes. Thus, each display mode of the predetermined selection of the plurality of display modes comprises at least one displayable entity of at least one graphics container of at least one display layer as defined by the additional configuration data.

One or more display mode of the predetermined selection of the plurality of display modes may also comprise a plurality of displayable entities of the at least one graphics container of the at least one display layer.

One or more display mode of the predetermined selection of the plurality of display modes may also comprise a plurality of displayable entities of a plurality of graphics containers of the at least one display layer.

One or more display mode of the predetermined selection of the plurality of display modes may also comprise a plurality of displayable entities of a plurality of graphics containers of a plurality of display layer.

Thus, by positioning instances of displayable entities from more than one of the layers into the same portion, the visibility of the instances of displayable entities may be controlled locally within each portion by means of the absolute visibility associated to each layer and/or each graphics container.

In one example the mode control unit 17 is arranged to have access to the above described additional configuration data identifying which one or more graphics container of which one or more display layer that constitute each of said display modes. The mode control unit 17 in this example is further arranged to receive information relating to a selection of a display mode from the predetermined selection of the plurality of display modes. The mode control unit 17 is then able to control what display content, i.e. which graphics container of which one or more display layer, that is to be visible, based on the selection of display mode. This facilitates handling safety aspects of the vehicular display system since control over which display content that is to be visible is centralized to the mode control unit 17. In more detail the mode control unit 17 is able to ensure that display content, e.g. displayable entities, currently intended for presentation in the vehicular display system is correctly displayed as intended based on the above mentioned additional configuration data and that display content currently not intended to be displayed in the vehicular display system is not displayed. This also means that fail safety is not fully reliant on each of the client systems C1-CN being properly configured since the mode control unit 17 is able to cause a display of intended display content associated to selected display mode even if one or more of the client systems being configured in a faulty fashion. In more detail a client system being configured in a faulty fashion is not able to disturb displaying display contents from rest of the client system associated to the selected display mode.

To activate or select a desired display mode of the predetermined selection of the plurality of display modes user input relating to a desired display mode provided via the input means 10 cause a message to be sent to the mode control unit 17. Said message comprising information relating to which graphics containers of which display layers are included in the desired display mode. The mode control unit may then cause the display server to set the visibility parameters of the graphics containers of the display layers included in the desired display mode to TRUE and to set the visibility parameters of the graphics containers of the display layers associated to each of the display modes different than the desired display mode to FALSE.

Furthermore, fail safety is provided by means of arranging the graphic containers in the display layers depending on the criticality of the information provided by the displayable entities to be displayed since the display layers are displayed in a predetermined order defined by the above described priority scheme.

Selection of a desired display mode of the predetermined selection of the plurality of display modes may be configured to be selected based on one or more of the following criterions selected from a group of criterions comprising predetermined selection i.e. static selection, tactics, current operation of the aircraft, user selection. The selection may affect the currently visualized display mode(s) in one physical display surface or several physical display surfaces.

As an example the instances of displayable entities associated with a first client system C1, through the respective definition file to the first display layer L1 may be assigned to a first portion of the first display layer L1 corresponding to a first portion of the physical display surface 13, 16. The first portion may correspond to a display area covering the lower half of the available display surface of the respective physical display surface 13, 16. The instances of displayable entities associated with a second client system C2, through the respective definition file to the second display layer L2 may be assigned to a second portion of the second display layer L2 corresponding to a second portion of the physical display surface 13, 16. The second portion may correspond to a display area covering the upper half of the available display surface of the respective physical display surface 13, 16. The instances of displayable entities associated with a third client system C3, through the respective definition file to the third display layer L3 may also be assigned to the second portion of the third display layer L3 corresponding to the said second portion of the physical display surface 13, 16. Thus, the instances of the displayable objects associated to the second and third display layer L2, L3 overlap in the second portion of the respective physical display surface 13, 16. The visibility of the instances associated to the second and third display layer L2, L3 is then in default mode controlled by the hierarchy parameters defining order of visibility associated to the respective layer and may subsequently be modified by controlling the absolute visibility of each of the respective overlapping layers. The instances associated to the first display layer L1 does not affect the visibility or become affected by modifications of the visibility associated to either of the second and/or third layer L2, L3, due to being positioned in another display portion namely the first portion.

Accordingly, the at least one operator will be given the predetermined selection of display modes comprising a first and a second display mode. The first display mode corresponding to visualization of the instances of displayable entities associated to the first display layer L1 in the first portion and to visualization of the instances of displayable entities associated to the second display layer L2 in the second portion. The second display mode corresponding to visualize the instances of displayable entities associated to the first display layer L1 in the first portion and to visualization of the instances of displayable entities associated to the third display layer L3 in the second portion. The desired display configuration may then be selected by means of the input device 10.

It is to be noted that the number of different display portions may differ from the example above. The number of different display layers L1-L3 with associated instances of displayable entities designated to be positioned in each portion may further vary.

In one example the at least one operator is provided dynamic selection of display modes. As an example the dynamic selection may implemented by means of that the displayable entities of each layer may be assigned to a dynamic portion of the layer corresponding to a dynamic portion of the physical display surface 13, 16. The term dynamic refers herein to that the position and/or size of the portion may be modified during system run-time such as by means of the operator interacting with the system using the input device 10. By use of the dynamic portion the at least one operator may be given the selection of which of the available display content is to be presented where and on which of the available physical display surfaces 13, 16.

In one example the at least one operator is provided with a selection where at least one dedicated portion of the available physical display surfaces 13, 16 are arranged to present displayable entities associated to the graphical representation of the PFD irrespective of the selection from the at least one operator.

In one example a display content module is provided in the vehicular display system 1. The display content module may be implemented as part of the mode control unit 17. The display content module may be arranged to register the definition files available to each flight display 2, 3. The display content module may be arranged to determine the associated client system C1-CN and the respective functionality associated to the respective client system C1-CN from the registered definition files. The information from the registered layer definition files may then be compiled and subsequently used to provide basis for the selection by means of the mode control unit 17 of desired display content provided to the at least one operator.

In one example an event concentration unit 18 is provided in the vehicular display system 1. The event concentration unit 18 is arranged to receive all data messages via the communication bus 4 related to user inputs, also referred to as events from a plurality of flight displays 2, 3. The display server of each flight display 2, 3 may be arranged to transmit all data messages related to the events to the event concentration unit 18. Upon receipt of the data messages related to user inputs, the event concentration unit 18 may be arranged to detect an identity of the intended receiving client system C1-CN associated to the data message and to forward the respective data message to the correct client system C1-CN. The event concentration unit 18 may be a centralized unit implemented in software. The event concentration unit 18 may in one example be arranged to identify the client system C1-CN associated to the respective instantiated displayable entity issuing the event based on information provided in the data message on basis of ARINC 661 protocol. The event concentration unit 18 may further be arranged to reside inside the FCC 5.

The concentration unit 18 may in one example be arranged prioritize between user inputs, with origin from user interaction with one and the same instantiated displayable entity, duplicated to several flight displays 2, 3. Said prioritization may be based on order of message arrival or statically assigned priorities assigned to different flight displays 2, 3 intended for a pilot and a co-pilot.

By implementing the event concentration unit 18, user interactions may be correctly transmitted to the associated client system C1-CN irrespective of the number of available flight displays, client systems C1-CN and/or the number of operators.

In one example the client systems C1-CN may be hosted on at least one avionics computer compliant with ARINC 653, specifications. The client systems C1-CN and/or event concentration unit 18 and mode control unit 17 may further be hosted on separate partitions of the at least one avionics computer such as the FCC 5.

In one example, the above described functions related to the processor 11, 14 and the respective memory 12, 15 may reside in separate partitions of the at least one avionics computer, compliant with ARINC 653, specifications.

In one example the vehicular display system 1 may be configured to be compatible with industry standard specifications such as the ARINC 661, cockpit display interface specifications.

Figure 5:
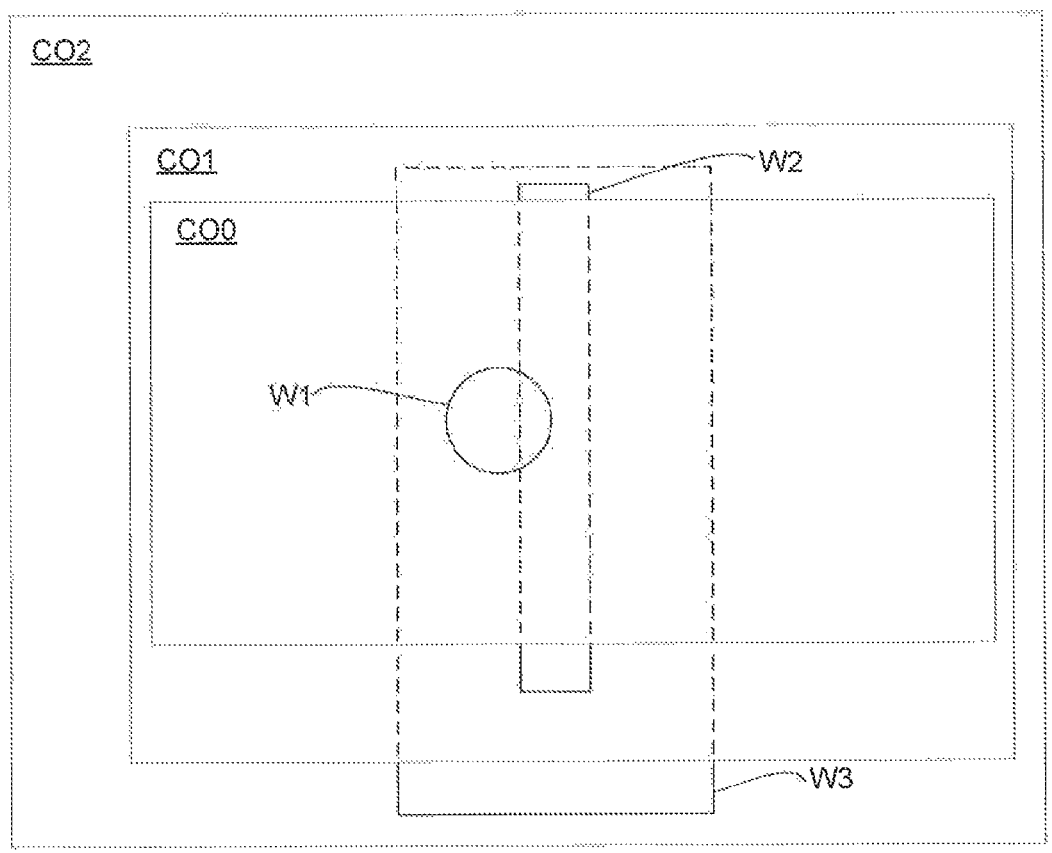
FIG. 5. shows schematically a display layout scheme according to an example of the present invention.

In one example with reference to FIG. 5 the display mode definition files or layer definition files may be arranged to comprise one or more additional parameters herein referred to as widget graphical relative visibility attributes. The widget graphical relative visibility attributes may be arranged to determine one or more aspect related to the visual appearance of its associated widget W1-W3, in order to be able to ensure visibility of the displayable entities, e.g. widgets, of each display container C00-C02 assigned to each display layer of the set of display layers (not shown) during a stacked display layer representation mode. The widget graphical relative visibility attributes associated to each widget may be arranged to determine one or more of the following display layer metrics: shape, size, background colour, outline, outline colour and/or clipping region.

The widget graphical relative visibility attributes are predetermined before operation of the display system. In more detail the widget graphical relative visibility attributes for each widgets are configured based on at least a relative position and at least a relative size of at least one widget, arranged in at least one display container of at least one display layer, underlying the widget for which the graphical widget relative visibility attribute is to be configured. In other words each widget are configured to be relatively smaller in size as compared to at least one other widget underlying each of said widgets as determined by the at least one relative position and the at least one relative size of the at least one underlying widget, wherein information related to which one or more widget is underlying which one or more other widget is determined by the priority scheme associated to the display layers and/or the display containers and the relative size/position of said one or more underlying widgets. Also the shape of each widget may be configured to cover the smallest possible area of at least one widget underlying each of said widgets for which the shape is to be configured. Further, each widget may be configured with at least one widget graphical relative visibility attribute selected from background colour, outline, outline in order to further enhance visual differentiation.

In one example at least one display mode is configured to comprise at least one middle display layer, at least one lower display layer and at least one upper display layer. The at least one middle display layer is placed in between said at least one upper display layer and said at least one lower display layer by means of the configured priority scheme associated to the display layers. Each of the at least one upper, middle and lower display layer comprises at least one display container having at least one widget positioned therein. The widget graphical relative visibility attributes for each widget is then configured based on the relative size/position of underlying widgets, i.e. underlying widgets being partly or fully overlapped by upper widgets as determined by the relative size and relative position, so that the at least one widget of the at least one upper display layer is relatively smaller than the at least one widget of the at least one middle layer and that the at least one widget of the at least one middle layer is relatively smaller than the at least one widget of the at least one lower layer i.e. widgets positioned in display containers of display layers. This means that critical data, e.g. flight critical, data may be placed in display layers/containers in between display layers/containers containing less important data and that less important data may be placed on top of flight critical data without substantially negatively affecting visibility of the flight critical data placed underneath since widgets overlaying flight critical data is only allowed to cover a small portion of the widgets associated to presenting flight critical data.

As an example the at least one lower layer may be configured to comprise at least one display container having associated thereto at least one widget associated to presenting a map/video stream representation, and the at least one middle display layer may be configured to comprise at least one display container having associated thereto at least one widget associated to presenting a representation of flight critical data such as a primary flight display and the at least one upper layer may be configured to comprise at least one display container having associated thereto at least one widget associated to presenting helper objects such as indicators or information boxes containing additional information to be overlaid upon data associated to the representation provided by the at least one middle display layer. This is advantageous since it allows for creation and subsequent display of widgets, in the form of for example helper objects, being less flight critical to be placed in display layers and/or display containers that are placed on top of widgets associated to presenting flight critical data. This would normally not be acceptable due to safety reason since flight critical data need to be accessible at all times during operation of the vehicle. However, due to the helper objects being configured by means of the widget graphical relative visibility attributes to be substantially smaller in size relative to underlying widgets associated to presenting flight critical data this can be handled with acceptable safety i.e. widget portions dedicated to flight critical data may at most only be partially covered by widgets associated to for example helper objects, or other suitable objects constituted by widgets, arranged to append additional information onto flight critical information.

In one example in case the display mode definition files comprise the widget graphical relative visibility attributes of each of the selected display layers and/or containers associated to the display mode processing of the configuration data results in that the display layer and/or containers and its associated widget graphical relative visibility attributes are presented dependent from the selected display mode. This means that a single widget may be provided with different widget graphical relative visibility attributes in different display modes. In more detail this means that widgets may be configured to appear different in different display modes by means of having several configurations of its widget graphical relative visibility attributes.

In one example in case the layer definition files comprise the widget graphical relative visibility attributes processing of the configuration data results in that the display layer and/or container and its associated widget graphical relative visibility attributes are presented independently from the selected display mode. This means that widgets will always graphically appear the same independently of selected display mode.

In the illustrated example with further reference to FIG. 5 a third display mode is provided. The third display mode comprises the first, second and third display layer , such as the display layers L1-L3 illustrated with reference to FIG. 4. The order of visibility associated to the third display mode is arranged such that the first display layer L1 is displayed on top of the second display layer L2 and the second display layer L2 is displayed on top of the third display layer L3. The first display layer L1 is configured to comprise a first display container CO0, determined to have a first widget W1 positioned at a first predetermined position in the first display container CO0, wherein the widget graphical relative visibility attributes of the first widget is arranged to define the first widget to be of a circular shape having a first predetermined background colour and a first predetermined size.

The second display layer L2 is configured to comprise a second display container CO1, determined to have a second widget W2 positioned at a second predetermined position in the second display container CO1, wherein the widget graphical relative visibility attributes of the second widget is arranged to define the second widget to be of a rectangular shape having a second predetermined background colour and a second predetermined size.

The third display layer L3 configured to comprise a third display container CO2, determined to have a third widget W3 positioned at a third predetermined position in the third display container CO2, wherein the widget graphical relative visibility attributes of the third widget is arranged to define the third widget to be of a rectangular size having a third predetermined background colour and a third size. At least one of the first and second widgets W1-W2 may comprise an outline (not shown) of a different colour than the background of the display window, in order to enhance visual differentiation between the widgets W1-W2. The third widget W3 may be provided with an outline with a colour matching the background of the display window. Visibility of all three display layers is set to TRUE and the order of visibility is defined to cause the first display layer to be rendered on top of the second and third display layer and further to cause the second display layer to be rendered on top of the display third layer. This also means that the first display container CO0 and its associated content, e.g. widgets, is rendered on top of the second display container CO1 and that the second display container is rendered on top of the third display container CO2. Since both the display layers and display containers are transparent only the widgets W1-W3 are truly visible. This further means that the display representation or presented image associated to the third display mode as seen by a user of the display system would comprise the first widget W1 in its entirety, the second widget W2 partially covered by the first widget W1 and the third widget W3 partially covered by the first and second widget. In more detail by means of the defined order of visibility among the display layers L1-L3, the widgets, e.g. the first widget W1, associated to and thereby also positioned somewhere inside the first display container CO0 of the first display layer L1 covers parts of other widgets, e.g. the second and third widgets W2-W3, associated to and thereby also positioned somewhere inside the second display and third display container CO1-CO2 of the second and third display layers L2-L3 respectively as illustrated by dashed lines in FIG. 5. Further the widgets, e.g. the second widget W2, associated to and thereby also positioned somewhere inside the the second display container CO1 of the second display layer L2 covers parts of other widgets, e.g. the third widgets W3, associated to and thereby also positioned somewhere inside the third display container CO2 of the third display layer L3 as illustrated by dashed lines in FIG. 5

Thus, by configuring each widget with respect to its widget graphical attributes based on relative position/size of underlying widgets, a display representation can be formed wherein less important symbolics, e.g. widgets W1 forming objects, such as helper objects can be placed on top of more important display symbolics without compromising the ability of a user to view flight critical data. Each of the widgets may be provided with an outline depending if such outline enhances visual differentiation between different widgets, i.e. improve the ability of an operator of the vehicular display system to be able to discriminate from information provided by different widgets. However, for some cases symbolics, i.e. widgets may be provided without an outline. As an example of such cases important symbolics, such as widgets providing critical information may be placed underneath less important symbolics, intended as helper objects and/or guidance objects providing help and/or guidance. For this example the less important symbolics placed on top of the important symbolics may be provided without an outline whereas the more important symbolics may be provided with an outline.

This further provides an advantage in terms of ease of graphical user interface design since rather than as traditionally forming one or more complete display representations, i.e. a display representation intended for an entire display window, by defining all desired display contents including their size and placement in the display window one or more complete display representations may instead be constructed by defining a number of display containers together with one or more widgets associated to each display container and then combining a selection of display containers and its associated content so as to form one or more desired display representations e.g. display mode, wherein potential partial overlap of widgets of different display containers/layers can be handled by means of the above described widgets graphical relative visibility attributes. This for example means that one and the same defined display container together with its associated content may be re-used for several different complete display representations, whereby the amount of work involved in creation of the graphical user interface is reduced.

This further provides an advantages in terms of flexibility such as in relation to shifting display representation during operation of the display system, such as for example by shifting display mode or adjusting visibility of components associated to a current display mode since display contents is partitioned into display containers, wherein the visibility of each display container and associated display content may be adjusted individually by means of user interaction. Thus, rather than as traditionally to toggle between static preformatted display representations a user may select to deactivate/activate visibility of display containers of a current display mode i.e. adjust the visual appearance and amount of information included in at least a portion of the current display mode or select a different combination of display containers i.e. different display mode.

It is to be noted that the configuration of the third display mode may be different than the illustrated example with reference to FIG. 5. As an example the third display mode may comprise a different number of display layers and/or different suitable combination of geometrical shape, size and/or colour. Also the number of display containers and their association to the display layers may be different. Further, in case at least one display layer comprises more than one display container an approach similar to the above described approach associated to the display layers for handling relative visibility of widgets positioned within each display container of the at least one layer having more than one display container may be implemented.

In one example currently active display contents i.e. displayable entities associated to currently active display layers L1-L3, such as exemplified with reference to FIG. 4, are arranged to continuously be updated with streamed information provided from the plurality of control modules C1-CN. The currently active display layers are display layers with layer visibility currently set to TRUE. In this example streamed information provided from the plurality of control modules C1-CN arranged to be provided to currently in-active display contents i.e. displayable entities associated to currently in-active display layers L1-L3 is arranged to continuously be stored in at least one memory buffer such as for example stored in at least one memory buffer of the memory 12, 15. The currently in-active display layers are display layers with layer visibility currently set to FALSE.

FIG. 6 schematically illustrates an example of a method for a display system. This example relates to provide flexible organization of at least one displayable entity of a set of displayable entities in a display system 1 based on assigning at least one displayable entity of the set of displayable entities W1-W3 to at least one display container of at least one display layer in order to provide means for a flexible presentation of a plurality of display contents i.e. displayable entities with associated information. In more detail the flexible presentation is enabled by controlling the visibility of the display containers and/or display layers. By controlling the visibility of the display containers and/or display layers the visibility of the respective associated displayable entity, e.g. widget, and/or displayable entities, e.g. widgets, is also controlled.

In a first method step s100 information related to descriptions of a set of displayable entities W1-W3, at least one modifiable attribute of at least one displayable entity of the set of displayable entities and configuration data is provided. In more detail the information is provided to at least one memory unit 12, 15 associated to display means 2, 3. After the method step s100 a subsequent method step s110 is performed.

In the method step s110 the information of said at least one memory unit 12, 15 is processed. In more detail the information is processed by at least one processor 11, 14 to control at least one display image to be presented on at least one at least one display unit such as for example at least one of the physical display surface 13, 16. After the method step s110 a subsequent method step s120 is performed.

In the method step s120 information from a plurality of control modules C1-CN is streamed. In more detail the information is streamed to said at least one memory unit 11, 14 accessible to said at least one processor. The streamed information relate to the at least one modifiable attribute of the at least one displayable entity of the set of displayable entities so as to enable the at least one processor to update the at least one display image using the information streamed from the plurality of control modules. After the method step s120 a subsequent method step s130 is performed.

In the method step s130 a definition of at least one transparent display layers L1-L3 is provided in the configuration data. In more detail each of the at least one display layer define a display region positioned within one or more display windows WI1-WI2. Each of said one or more display window defining predefined a portion of the at least one display unit 13, 16 of one or more flight display 2, 3. After the method step s130 a subsequent method step s140 is performed.

In the method step s140 a definition of at least one transparent display container CO1-CO2 is provided in the configuration data. In more detail the definition of the plurality of the at least one transparent display container is provided based on associating the at least one transparent display container to the at least one transparent display layer L1-L3. Each of the at least one transparent display container being positioned within a portion of the display region defined by the at least one transparent display layer to which the transparent display container is associated. Each of the at least one transparent display container having at least one displayable entity of the set of displayable entities positioned within the portion of the display region defined by the respective at least one transparent display container. After the method step s140 a subsequent method step s150 is performed.

In the method step s150 a definition of a at least one display mode is provided in the configuration data. In more detail the definition of the at least one display mode is provided based on associating a predetermined selection of one or more of said at least one transparent display container of one or more of said at least one display layer. The predetermined selection provide for each of the at least one display mode a predetermined combination of the at least one default graphics display object of one or more of the at least one transparent display container of the one or more of said at least one display layer. By processing the information related to the at least one display mode using the at least one processor the at least one display image can be formed. After the method step s150 the method ends.

In one example, a further method step s160 (not shown) is performed. In the method step s160 each of said at least one transparent display container is controlled to assume a visible or a transparent state. In more detail each of said at least one transparent display container is controlled to assume a visible or a transparent state according to the predetermined selection such as for example defined by the at least one display mode. The visible and transparent state of each of the at least one transparent display container is arranged to affect the visibility of each of the at least one displayable entity associated to the at least one transparent display container being controlled. After the method step s160 the method may end or be repeated from any of the steps s110 and/or s120.

In one example, a further method step s170 (not shown) is performed. In the method step s170 a definition of at least one predetermined graphics attribute is provided in the configuration data. In more detail the at least one predetermined graphics attribute is provided for each of at least one first displayable entity of the set of displayable entities. The at least one predetermined graphics attribute each being arranged to determined one or more graphics property of each of said at least one first displayable entity. As an example the at least one predetermined graphics attribute may comprise one or more graphics attribute selected from a group of graphics attributes comprising a colour, an outline colour, a shape and a size.

After the method step s170 the method may end or be repeated from any of the steps s110, s120 and/or s160.

In one example, the above described method step s170 (not shown) is performed to determine the size and/or shape of each of the at least one first default graphics display object relative to a size and/or shape of one or more of the other default graphics display objects of the set of default graphics display objects. In more detail the method step s170 is performed to enable each default graphics display object of the set of default graphics display objects at least being partially visible irrespectively of selected display mode. This means that each of the displayable entities of the set of displayable entities always will be at least partially visible i.e. not fully obscured by overlapping displayable entities as determined by the layer and/or container hierarchy i.e. priority scheme also referred to as the order of visibility.

After the method step s170 the method may end or be repeated from any of the steps s110, s120 and/or s160.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A display system, the display system comprising:
   display means comprising:
   at least one display unit arranged to present at least one display image,
   at least one memory unit comprising information related to (a) descriptions of a set of default graphics display objects, (b) at least one modifiable attribute of at least one default graphics display object of the set of default graphics display objects, and (c) configuration data, and at least one processor arranged to process the information of said at least one memory unit to control the at least one display image; and a plurality of control modules arranged to stream information related to the at least one modifiable attribute to said at least one memory unit to enable the at least one processor to update the at least one modifiable attribute, wherein:

the display system is compliant with the Aeronautical Radio, Incorporated (ARINC) 661 specification, and the configuration data, when processed by the at least one processor, is configured to cause display of:

one or more transparent display layers, each of said one or more transparent display layers being arranged to define a display region positioned within one or more display windows of said at least one display unit, a first transparent display layer of the one or more transparent display layers being configured to not prevent the visibility of a second display layer of the one or more transparent display layers when the first transparent display layer at least in part overlaps the second display layer, a display layer being a highest level container in a hierarchical structure of displayable entities, and a plurality of transparent display containers, each transparent display container is associated to one or more of the one or more transparent display layers, each of the plurality of containers (a) is a container widget as defined by the ARINC 661 standard, (b) is positioned in a portion of said display region, and (c) has at least one default graphics display object of the set of default graphics display objects positioned within the portion of the display region, and the configuration data is further configured to, when processed by the at least one processor, cause the at least one transparent display layer to be displayed in accordance with at least one display mode, each of said at least one display mode comprising a predetermined selection of one or more of said at least one transparent display container of one or more of said at least one transparent display layer to provide for each of the at least one display mode a predetermined combination of the at least one default graphics display object of one or more of the at least one transparent display container of the one or more of said at least one transparent display layer in order to form the at least one display image based on the at least one processor processing the information related to the at least one display mode.

2. The display system according to claim 1, wherein each of said one or more transparent display containers being controllable to assume a visible or an invisible state according to the predetermined selection, wherein said visible or invisible state is arranged to affect the visibility of each of the at least default graphics display object associated to the plurality of transparent display containers being controlled.

3. The display system according to claim 1, wherein the configuration data is arranged to define a plurality of transparent display layers.

4. The display system according to claim 1, wherein the configuration data is arranged to define a plurality of display modes.

5. The display system according to claim 1, wherein the at least one display mode is selectable by means of a user interface or automatically selected based on information related to current operation of a vehicle arranged to host the display system.

6. The display system according to claim 1, wherein the at least one processor is arranged to present the at least one display image by super positioning overlapping transparent display layers and/or portions thereof, based on a predetermined layer priority scheme arranged to determine the order of visibility among the plurality of transparent display layers.

7. The display system according to claim 1, wherein the at least one processor is arranged to present the at least one display image by super positioning overlapping transparent display containers and/or portions thereof, based on a predetermined container priority scheme arranged to determine the order of visibility among a plurality of transparent display containers associated to each of the one or more transparent display layers.

8. The display system according to claim 1, wherein each of the one or more transparent display layers being controllable to assume a visible or an invisible state according to the predetermined selection, wherein said visible or invisible state is arranged to affect the visibility of each of the at least default graphics display object associated to each of the at plurality of display containers associated to the one or more transparent display layers being controlled.

9. The display system according to claim 1, wherein the configuration data is arranged to define at least one predetermined graphics attribute for each of at least one first default display graphics object of the set of default graphics objects, wherein said at least one predetermined graphics attribute each being arranged to determine one or more graphics property of each of said at least one first default graphics display object.

10. The display system according to claim 9, wherein the at least one predetermined graphics attribute comprises one or more graphics attribute selected from a group of graphics attributes comprising a colour, an outline colour, a shape and a size.

11. The display system according to claim 9, wherein the at least one predetermined graphics attribute for each of said at least one first default graphics display object is arranged to determine the size and/or shape of each of the at least one first default graphics display object relative to a size and/or shape of one or more of the other default graphics display objects of the set of default graphics display objects such that when the configuration data is processed by the at least one processor, the set of default graphics display objects are displayed so that each default graphics display object of the set of default graphics display objects is at least partially visible irrespectively of selected display mode.

12. The display system according to claim 9, wherein the configuration data is arranged to define the at least one predetermined graphics attribute based on a relative position of one or more default graphics display object of the set of default graphics display objects, the predetermined layer priority scheme arranged to determine at least one of an order of visibility among the plurality of transparent display layers or an order of visibility among the plurality of transparent display containers associated to each of the one or more transparent display layers.

13. The display system according to claim 8, wherein the at least one memory unit is arranged to buffer the information streamed from the plurality of control modules that are associated to the at least one modifiable attribute of the at least one default graphics display object of the set of default graphics display objects of each of the at least one transparent display container of each of the one or more transparent display layers currently being in the invisible state.

14. A method for a display system, the method comprising the steps of:
  providing information to at least one memory unit associated to display means, said information relating to (a) descriptions of a set of default graphics objects, (b) at least one modifiable attribute of at least one of default graphics display object of the set of default graphics display objects, and (c) configuration data;
  processing in at least one processor the information of said at least one memory unit to control at least one display image to be presented on at least one display unit; and
  streaming information from a plurality of control modules, said information relating to the at least one modifiable attribute to said at least one memory unit to enable the at least one processor updating the at least one modifiable attribute;
  wherein:
    the display system is compliant with the Aeronautical Radio, Incorporated (ARINC) 661 specification, and
    when processed by the at least one processor, the configuration data is configured to cause display of:
      one or more transparent display layers, each of said one or more transparent display layers defining a display region positioned within one or more display window of said at least one display unit, a first transparent display layer of the one or more transparent display layers being configured to not prevent the visibility of a second display layer of the one or more transparent display layers when the first transparent display layer at least in part overlaps the second display layer, a display layer being a highest level container in a hierarchical structure of displayable entities; and
      a plurality of transparent display containers, each transparent display container is associated to one or more of the one or more transparent display layers, each of the plurality of containers (a) is a container widget as defined by the ARINC 661 standard, (b) is positioned in a portion of said display region, and (c) has at least one default graphics display object of the set of default graphics display objects positioned within the portion of the display region; and
    the configuration data is further configured to, when processed by the at least one processor, cause the at least one transparent display layer to be displayed in accordance with at least one display mode, each of said at least one display mode comprising a predetermined selection of one or more of said at least one transparent display container of one or more of said at least one transparent display layer to provide for each of the at least one display mode a predetermined combination of the at least one default graphics display object of one or more of the at least one transparent display container of the one or more of said at least one transparent display layer in order to forming the at least one display image based on the at least one processor processing the information related to the at least one display mode.

15. The method according to claim 14, further comprising:
  controlling each of said plurality of display containers to assume a visible or an invisible state according to the predetermined selection, wherein said visible or invisible state is arranged to affect the visibility of each of the at least default graphics object associated to the corresponding transparent display container.

16. The method according to claim 15, further comprising:
  providing in the configuration data a definition of at least one predetermined graphics attribute for each of at least one first default display graphics object of the set of default graphics objects, wherein said at least one predetermined graphics attribute each being arranged to determine one or more graphics property of each of said at least one first default graphics display object.

17. The method according to claim 16, wherein the step of providing in the configuration data a definition of at least one predetermined graphics attribute determines at least one of a size or shape of each of the at least one first default graphics display object relative to at least one of a size or shape of one or more of the other default graphics display objects of the set of default graphics display objects so as to enable each default graphics display object of the set of default graphics display objects at least being partially visible irrespectively of selected display mode.

* * * * *